UNITED STATES PATENT OFFICE.

ARTHUR J. KEEBLE, OF PETERBOROUGH, ENGLAND.

MANUFACTURE OF BRICKS, TILES, OR THE LIKE.

SPECIFICATION forming part of Letters Patent No. 699,534, dated May 6, 1902.

Application filed August 17, 1901. Serial No. 72,441. (No model.)

*To all whom it may concern:*

Be it known that I, ARTHUR JAMES KEEBLE, a subject of the King of Great Britain, residing at Peterborough, in the county of Northampton, England, have invented certain new and useful Improvements in the Manufacture of Bricks, Tiles, or the Like, of which the following is a full, clear, and exact description, and for which I have made application for patent in Great Britain, dated the 16th day of May, 1901.

The invention has for its object an improvement in the manufacture of bricks, tiles, and the like whereby I avoid the discoloration, technically known as "scum," produced in the drying or firing process, so that the article treated shall be when fired of the natural color inherent to the clay of which it is made—that is to say, the exterior of the finished article shall have a uniform color throughout and be practically the same color as the interior thereof. For this purpose after the brick, tile, or the like has been molded or otherwise shaped, and previous to the drying and firing operation I dip it into or otherwise coat it with a solution or preparation consisting of animal colloids or colloidal matters—such, for instance, as glue, animal albumen, gelatin, isinglass, and like animal albuminous or keratinous matters. The nature of such a solution being to gelatinize on cooling, the solution may either be used warm—that is, above the congealing-point—or it may be used cold—that is, below the congealing-point—by the addition of acids or other substances, which enable such colloid solutions to retain their fluidity at temperatures below the otherwise normal congealing-point. The brick, tile, or other article may be either entirely coated or only partially coated with the before-mentioned solution wherever the exterior is required to be the same as the interior thereof. The following solution is found to give good results, viz: Twenty-five pounds of glue dissolved in twenty gallons of water; but any of the other substances above enumerated may be substituted for the glue and the proportions of the same may admit of certain modifications, according to the character and nature of the clay to be operated upon, without departing from the peculiar character of my invention. By these means bricks of uniform color throughout may be obtained even when drying and firing the same in a Hoffman kiln or the like.

I am aware that it has been proposed to prevent the formation of scum on the surface of pottery, tiles, and other clay manufactures by coating the articles previous to firing with a solution of flour or starch and also by the application of coal-tar. This, therefore, I do not claim; but my invention is limited to the use of solutions of colloid—such as glue, gelatin, isinglass, or other animal albuminous or keratinous matters—as I have discovered that the use of such animal gelatin products effects a superior result as compared with solutions from vegetable substances, such as flour or the like, and also as compared with tar.

Having fully described my invention, what I claim, and desire to secure by Letters Patent, is—

1. The process of manufacturing bricks, tile and the like, by first shaping the article, then coating it with a solution of colloid, such as glue animal albumen, gelatin, isinglass or equivalent keratinous matters and subsequently drying and firing the same.

2. The process of manufaturing bricks, tiles and the like, by first shaping the article, then partially coating it with a solution of colloid such as glue, animal albumen, gelatin, isinglass or equivalent keratinous matters, and subsequently drying and firing the same.

3. The process of manufacturing bricks, tiles and the like by applying to the surface thereof a solution of colloid, such as glue, animal albumen, gelatin, isinglass or equivalent keratinous matters, previous to drying and firing the same.

4. The process of treating earthen articles before drying and burning, which consists in coating the same with an animal colloid solution prepared from glue, animal albumen, gelatin, isinglass or the like, substantially as set forth.

In testimony whereof I affix my signature in presence of two witnesses.

A. J. KEEBLE.

Witnesses:
PERCY F. ROSE,
HORACE TOM PHILLIPS.